US009223469B2

(12) United States Patent
Neustaedter et al.

(10) Patent No.: US 9,223,469 B2
(45) Date of Patent: Dec. 29, 2015

(54) CONFIGURING A VIRTUAL WORLD USER-INTERFACE

(75) Inventors: Carman G. Neustaedter, Webster, NY (US); Kevin M. Gobeyn, Rochester, NY (US); Elena A. Fedorovskaya, Pittsford, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 1292 days.

(21) Appl. No.: 12/196,399

(22) Filed: Aug. 22, 2008

(65) Prior Publication Data

US 2010/0050088 A1 Feb. 25, 2010

(51) Int. Cl.
*G06F 3/00* (2006.01)
*G06F 3/0482* (2013.01)
*A63F 13/30* (2014.01)
*H04L 29/08* (2006.01)

(52) U.S. Cl.
CPC .............. *G06F 3/0482* (2013.01); *A63F 13/12* (2013.01); *H04L 67/08* (2013.01); *A63F 2300/535* (2013.01); *A63F 2300/5553* (2013.01); *A63F 2300/6018* (2013.01)

(58) Field of Classification Search
CPC . G06F 3/0482; A63F 13/12; A63F 2300/535; A63F 2300/5553; A63F 2300/6018; H04L 67/08
USPC ......................... 715/745, 744, 757, 848–852; 345/418–427
See application file for complete search history.

(56) References Cited

U.S. PATENT DOCUMENTS

| | | | | |
|---|---|---|---|---|
| 5,846,134 A * | 12/1998 | Latypov | ........................... | 463/46 |
| 5,995,119 A | 11/1999 | Cosatto et al. | | |
| 6,106,395 A * | 8/2000 | Begis | ............................... | 463/23 |
| 6,268,872 B1 * | 7/2001 | Matsuda et al. | .............. | 345/473 |
| 6,341,353 B1 * | 1/2002 | Herman | ................... | A63F 13/12 |
| | | | | 705/39 |
| 6,396,509 B1 * | 5/2002 | Cheng | ........................... | 715/706 |
| 6,519,571 B1 | 2/2003 | Guheen et al. | | |
| 6,793,580 B2 * | 9/2004 | Sinclair | .................... | A63F 13/12 |
| | | | | 434/322 |
| 6,957,390 B2 * | 10/2005 | Tamir et al. | .................... | 715/744 |
| 7,006,098 B2 | 2/2006 | Bickmore et al. | | |
| 7,065,553 B1 * | 6/2006 | Chesley | .................. | A63F 13/12 |
| | | | | 345/418 |
| 7,337,127 B1 * | 2/2008 | Smith | .................... | G06Q 30/02 |
| | | | | 345/592 |
| 7,402,105 B1 * | 7/2008 | Hutter | ..................... | A63F 13/12 |
| | | | | 434/128 |
| 7,620,894 B1 * | 11/2009 | Kahn | ............................ | 715/707 |
| 7,636,900 B2 * | 12/2009 | Xia | .............................. | 715/850 |
| 7,677,979 B2 * | 3/2010 | Van Luchene | .......... | A63F 13/12 |
| | | | | 463/42 |
| 7,775,885 B2 * | 8/2010 | Van Luchene et al. | ......... | 463/42 |
| 7,885,973 B2 * | 2/2011 | Sastry et al. | ................... | 707/779 |
| 8,016,680 B1 * | 9/2011 | Hutter | ..................... | A63F 13/12 |
| | | | | 434/128 |
| 8,055,602 B2 * | 11/2011 | Tirpak et al. | .................... | 706/47 |

(Continued)

OTHER PUBLICATIONS

"MMORPG's—Virtual Economics Spilling into the Real World: http-www.cs.duke.edu-courses-current-cps182s-projects-mmorpg.pdf" dated Apr. 27, 2006, last accessed Jun. 28, 2012.*

*Primary Examiner* — Jessica Chuang (57) ABSTRACT

A particular user's user-interface to a virtual world is customized based at least upon an analysis of behavioral characteristics of the user, the behavioral characteristics indicating how the user controls an avatar in the virtual world. In this regard, image-capture-or-sharing tools, avatar-appearance-editing tools, or both may be configured in the user-interface based at least upon the analysis of the behavioral characteristics. Information pertaining to results of the configuring of the user-interface may be stored in a processor-accessible memory system.

18 Claims, 4 Drawing Sheets

(56) References Cited

U.S. PATENT DOCUMENTS

| | | | | |
|---|---|---|---|---|
| 8,108,459 | B1* | 1/2012 | Hoffman et al. | 709/203 |
| 8,190,733 | B1* | 5/2012 | Hoffman | G06Q 30/00 709/203 |
| 8,316,310 | B2* | 11/2012 | Champion et al. | 715/757 |
| 8,401,912 | B2* | 3/2013 | Ganz | A63F 13/12 705/26.1 |
| 8,595,811 | B2* | 11/2013 | Johnson | A63F 13/12 463/29 |
| 8,992,316 | B2* | 3/2015 | Smith | A63F 13/12 463/31 |
| 2001/0056383 | A1* | 12/2001 | Shuster | 705/27 |
| 2002/0067362 | A1 | 6/2002 | Agostino Nocera et al. | |
| 2002/0138607 | A1 | 9/2002 | O'Rourke et al. | |
| 2002/0152134 | A1* | 10/2002 | McGlinn | 705/26 |
| 2003/0171147 | A1* | 9/2003 | Sinclair | A63F 13/12 463/39 |
| 2004/0006595 | A1* | 1/2004 | Yeh et al. | 709/204 |
| 2004/0095383 | A1* | 5/2004 | Pfeifer et al. | 345/745 |
| 2004/0221224 | A1* | 11/2004 | Blattner et al. | 715/500.1 |
| 2005/0054381 | A1 | 3/2005 | Lee et al. | |
| 2005/0118996 | A1* | 6/2005 | Lee et al. | 455/425 |
| 2005/0137015 | A1 | 6/2005 | Rogers et al. | |
| 2006/0178964 | A1* | 8/2006 | Jung et al. | 705/35 |
| 2006/0184355 | A1 | 8/2006 | Ballin et al. | |
| 2006/0190284 | A1* | 8/2006 | Jung et al. | 705/1 |
| 2006/0235790 | A1* | 10/2006 | Jung et al. | 705/39 |
| 2007/0016476 | A1 | 1/2007 | Hoffberg et al. | |
| 2007/0035548 | A1* | 2/2007 | Jung et al. | 345/474 |
| 2007/0080967 | A1 | 4/2007 | Miller | |
| 2007/0118420 | A1* | 5/2007 | Jung | G06Q 20/06 705/14.12 |
| 2007/0218987 | A1* | 9/2007 | Van Luchene et al. | 463/30 |
| 2008/0020361 | A1* | 1/2008 | Kron et al. | 434/262 |
| 2008/0215973 | A1* | 9/2008 | Zalewski et al. | 715/706 |
| 2008/0222262 | A1* | 9/2008 | Oh et al. | 709/206 |
| 2008/0231686 | A1* | 9/2008 | Redlich | H04N 7/15 348/14.08 |
| 2008/0254419 | A1* | 10/2008 | Cohen | 434/219 |
| 2008/0254423 | A1* | 10/2008 | Cohen | 434/308 |
| 2008/0254424 | A1* | 10/2008 | Cohen | 434/308 |
| 2008/0254425 | A1* | 10/2008 | Cohen | 434/308 |
| 2008/0254426 | A1* | 10/2008 | Cohen | 434/308 |
| 2008/0303811 | A1* | 12/2008 | Van Luchene | A63F 13/12 345/419 |
| 2009/0019367 | A1* | 1/2009 | Cavagnari et al. | 715/716 |
| 2009/0106671 | A1* | 4/2009 | Olson et al. | 715/757 |
| 2009/0144639 | A1* | 6/2009 | Nims et al. | 715/757 |
| 2009/0158150 | A1* | 6/2009 | Lyle | A63F 13/12 715/706 |
| 2009/0177976 | A1* | 7/2009 | Bokor et al. | 715/753 |
| 2009/0199095 | A1* | 8/2009 | Nicol, II | G06F 3/0481 715/704 |
| 2009/0204471 | A1* | 8/2009 | Elenbaas et al. | 705/9 |
| 2009/0210282 | A1* | 8/2009 | Elenbaas et al. | 705/9 |
| 2009/0216730 | A1* | 8/2009 | Sastry et al. | 707/4 |
| 2009/0254417 | A1* | 10/2009 | Beilby | G06N 3/004 706/45 |
| 2009/0254868 | A1* | 10/2009 | Bokor et al. | 715/863 |
| 2009/0262107 | A1* | 10/2009 | Castelli et al. | 345/419 |
| 2009/0276718 | A1* | 11/2009 | Dawson et al. | 715/753 |
| 2009/0287571 | A1* | 11/2009 | Fujioka | 705/14.54 |
| 2009/0287682 | A1* | 11/2009 | Fujioka et al. | 707/5 |
| 2009/0288015 | A1* | 11/2009 | Fujioka | 715/747 |
| 2009/0300525 | A1* | 12/2009 | Jolliff | H04M 1/72544 715/764 |
| 2009/0327928 | A1* | 12/2009 | Dedis et al. | 715/763 |
| 2010/0005424 | A1* | 1/2010 | Sundaresan et al. | 715/849 |
| 2010/0037147 | A1* | 2/2010 | Champion et al. | 715/751 |
| 2010/0050083 | A1* | 2/2010 | Axen et al. | 715/726 |
| 2010/0050237 | A1* | 2/2010 | Bokor et al. | 726/4 |
| 2010/0067882 | A1* | 3/2010 | Axen et al. | 386/124 |
| 2011/0066943 | A1* | 3/2011 | Brillon et al. | 715/716 |
| 2012/0315015 | A1* | 12/2012 | Axen et al. | 386/241 |
| 2013/0318441 | A1* | 11/2013 | Brillon et al. | 715/716 |
| 2014/0046661 | A1* | 2/2014 | Bruner | 704/235 |

* cited by examiner

CONFIGURING A VIRTUAL WORLD USER-INTERFACE

FIELD OF THE INVENTION

This invention relates to configuring a virtual world user-interface. In particular, embodiments of the invention pertain to configuring a virtual world user-interface based at least upon an analysis of a user's behavioral characteristics when participating in the virtual world.

BACKGROUND

Virtual Worlds are shared and persistent computer-generated environments. They are shared because a virtual world can be accessed and used by multiple users at the same time. They are persistent because the virtual world continues to exist even when a user has left it. That is, other users can continue to participate in it. Virtual worlds can only be viewed through the utilization of electronic devices such as computers, and other display devices, such as PDA's, cell phones, etc. that communicate over a communication network, such as the Internet, with the virtual world. Virtual worlds are typically three-dimensional and immersive, though they can also be text-based only. A user typically enters a virtual world as a virtual representation. In the case of three-dimensional graphical virtual worlds, this virtual representation is often an avatar. Avatars are typically human-like beings or animals that users can select or create through user-interface controls. Users control the movement of avatars in the virtual world using a variety of interaction modalities such as keyboard or mouse interaction.

For example, Second Life is a virtual world created by Linden Lab. It is a social networking virtual world in the sense that users enter it, create a virtual representation in the form of an avatar, travel to various virtual locations, and converse with other users who are also in the virtual world. Conversing is done via textual or voice chat. The purpose of this particular virtual world is to socialize with other users. World of Warcraft is a massively multiplayer online roleplaying game created by Blizzard, Inc., which contains a virtual world. Users construct virtual representations in World of Warcraft in the form of avatars and enter the virtual world of World of Warcraft. Here users attempt to accomplish missions particular to the game. This may involve interacting with other users by talking to them or even waging battle.

In conventional virtual worlds, the same user-interface is presented to all users in the same manner, regardless of the particular needs of the user within the virtual world. Thus, it can be inefficient for users to find, access, and use the user-interface tools that are meaningful to them. For example, some virtual worlds present users with user-interface components that allow them to capture or share data about their virtual world experience. Not all users may require these tools and some may require different tools than others to undertake this task. Some virtual worlds also present users with user-interface components that allow them to create a preferred virtual representation, or "avatar", of oneself in the virtual world. Again, not all users require the same tools to create a desired virtual representation, yet the same tools are presented to all users. Some virtual worlds allow users to customize the user-interface controls that are presented to them or the manner in which they are presented, yet the act of customizing one's user-interface is often inefficient and sometimes complicated to perform. Thus, the user-interfaces of virtual worlds are not as customized as they could be and current customization processes are not desirable. Accordingly, a need in the art exists for an improved solution to generating user-interfaces to virtual worlds.

SUMMARY

The above-described problems are addressed and a technical solution is achieved in the art by systems and methods for configuring a particular user's user-interface to a virtual world, according to the various embodiments of the present invention. In an embodiment of the present invention, the virtual world is implemented by a data processing system, and the user has an associated avatar in the virtual world. In embodiments such as these, behavioral characteristics of the user are identified, the behavioral characteristics indicating how the user controls the avatar in the virtual world. Image-capture-or-sharing tools, avatar-appearance-editing tools, or both may be configured in the user-interface based at least upon an analysis of the behavioral characteristics of the user. The analysis of the behavioral characteristics of the user may include an analysis of data from an activity logger or a user profile associated with the user. Information pertaining to results of the configuring step may be stored in a processor-accessible memory system.

In some embodiments, the analysis of the behavioral characteristics indicates that the user exhibits a particular degree of permanence in the virtual world, and the configuring step configures the image-capture-or-sharing tools based at least upon the particular degree of permanence.

For example, in instances where the analysis of the behavioral characteristics indicates that the user exhibits a high degree of permanence in the virtual world, the configuring step may configure the image-capture-or-sharing tools to include or more efficiently include a posed image-capture tool, a collocated image-sharing tool, or both. The image-capture-or-sharing tools may further be configured to include or more efficiently include a spontaneous image-capture tool, a distributed image-sharing tool, or both. The high degree of permanence may be determined at least by a determination that the avatar (a) has a job in the virtual world, (b) owns property in the virtual world, (c) has a residence in the virtual world, (d) has a partner in the virtual world, or (e) combinations thereof.

In instances where the analysis of the behavioral characteristics indicates that the user exhibits a low degree of permanence in the virtual world, the configuring step may configure the image-capture-or-sharing tools to exclude a posed image-capture tool, a collocated image-sharing tool, or both. The image-capture-or-sharing tools may further be configured to include or more efficiently include a spontaneous image-capture tool, a distributed image-sharing tool, or both. The low degree of permanence may be determined at least by a determination that the avatar (a) does not have a job in the virtual world, (b) does not own property in the virtual world, (c) does not have a residence in the virtual world, and (d) does not have a partner in the virtual world.

In some embodiments of the present invention, the analysis of the behavioral characteristics indicates (a) a degree to which the user separates an identity of the avatar in the virtual world from an identity of the user in real life, (b) a number of identities the user presents in the virtual world, (c) a continuity of the avatar's identity over time, (d) a degree to which the avatar's identity visually resembles the user's identity, (e) a degree to which the avatar appears to be photorealistic, or (f) combinations thereof. In these instances, the configuring step configures the avatar-appearance-editing tools based at least upon the analysis of the behavioral characteristics.

In some embodiments of the present invention, the analysis of the behavioral characteristics indicates that the user controls the avatar to have a particular identity category, the particular identity category indicating a relationship between the avatar's identity and the user's identity. In these situations, the configuring step may configure the avatar-appearance-editing tools based at least upon the particular identity category.

For example, the particular identity category may be a realistic-identity category that indicates that the avatar's identity and the user's identity are consonant or substantially consonant. In this situation, the configuring step may configure the avatar-appearance-editing tools to include or more efficiently include a real-life-appearance-generation tool, a photo-realistic rendering tool, or both.

For another example, the particular identity category may be an ideal-identity category indicating that the avatar's identity is an ideal or a substantially ideal representation of the user's identity. In this situation, the configuring step may configure the avatar-appearance-editing tools to include or more efficiently include a real-life-appearance-generation tool, an appearance enhancing tool, or both.

For yet another example, the particular identity category may be a fantasy-identity category indicating that the avatar's identity is different or substantially different than the user's identity. In this situation, the configuring step may configure the avatar-appearance-editing tools to include or more efficiently include an appearance-refinement tool.

For still yet another example, in instances where the user has multiple identities in the virtual world the particular identity category may be a roleplayer-identity category indicating that the avatars' identities are different or substantially different than the user's identity. In this situation, the configuring step configures the avatar-appearance-editing tools to include or more efficiently include an appearance-refinement tool, a photo-realistic rendering tool, an identity management tool, or combinations thereof.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION

Users of a virtual world require different user-interfaces depending on the behaviors they exhibit in the virtual world. Various embodiments of the present invention configure such user-interfaces based at least on behavioral characteristics of the users. In this regard, the phrase "behavioral characteristics" refers to how a user controls his or her associated avatar(s) in the virtual world. For example, if a user exhibits a high degree of permanence, defined in more detail below, in the virtual world, such user's interface may be configured to include or more efficiently include advanced image-capture-or-sharing tools. For another example, depending upon the relationship between a user's identity and the user's avatar's identity, different avatar-appearance-editing tools may be provided or more efficiently provided to the user via the user-interface. Accordingly, it can be seen that tasks that are important to the user can be more efficiently conducted, and that a user's experience in a virtual world can become more enjoyable.

The invention is inclusive of combinations of the embodiments described herein. References to a particular embodiment and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the method or methods and the like is not limiting. Further, it should be noted that, unless otherwise explicitly noted or required by context, the word "or" is used in this disclosure in a non-exclusive sense.

Figure 1:
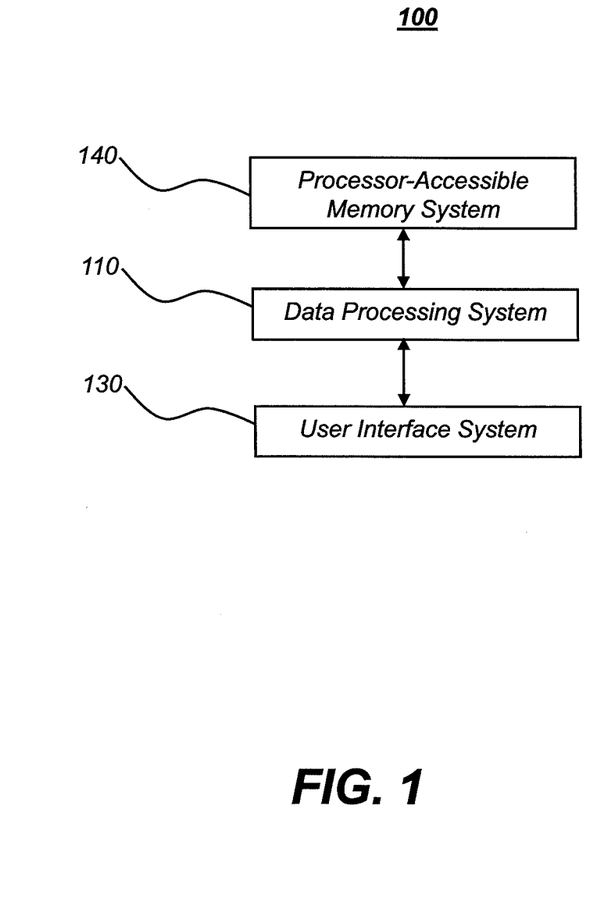
FIG. 1 illustrates a system for configuring a particular user's user-interface to a virtual world, according to an embodiment of the present invention.

FIG. 1 illustrates a system 100 for configuring a particular user's user-interface to a virtual world, according to an embodiment of the present invention. The system 100 includes a data processing system 110, a user-interface system 130, and a processor-accessible memory system 140. The processor-accessible memory system 140, and the user-interface system 130 are communicatively connected to the data processing system 110.

Figure 2:
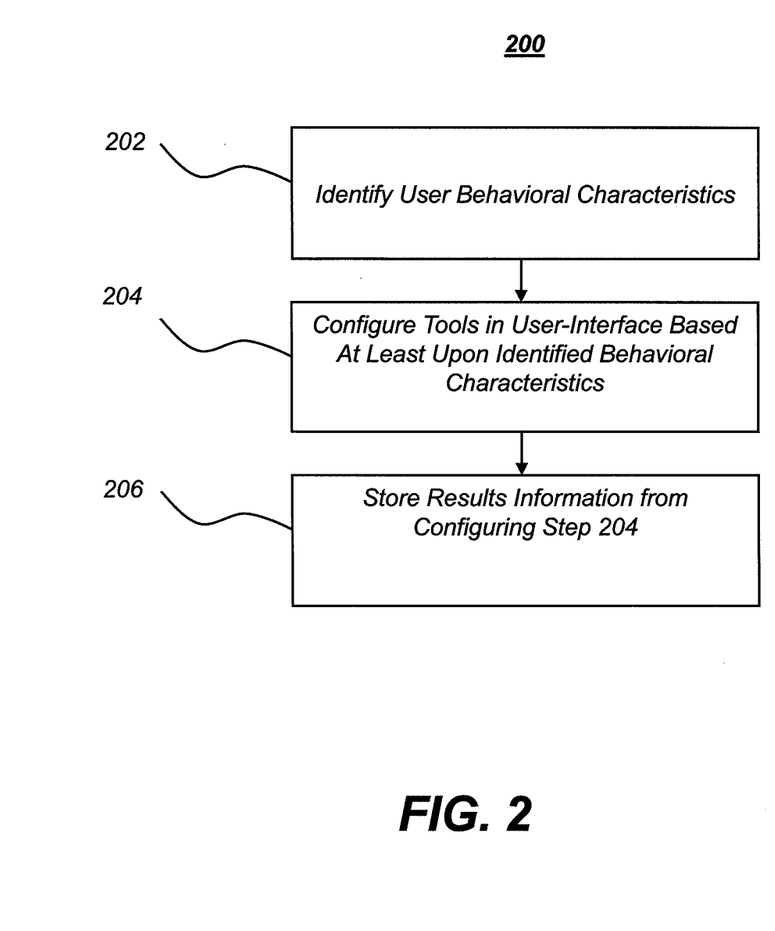
FIG. 2 illustrates a method for configuring a particular user's user-interface to a virtual world, according to an embodiment of the present invention.
Figure 3:
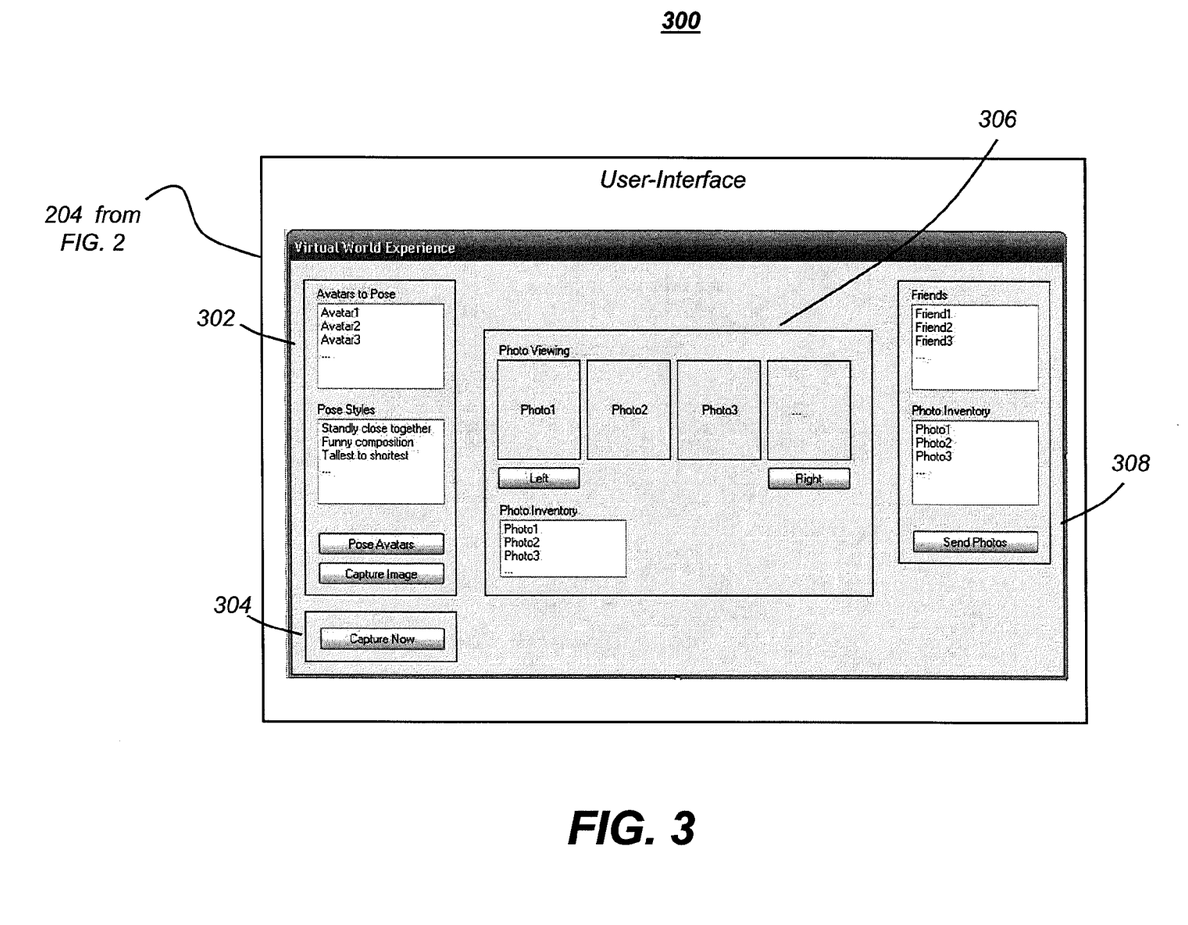
FIG. 3 is a screenshot of a sample user-interface where image-capture-or-sharing tools may be configured, according to an embodiment of the present invention.
Figure 4:
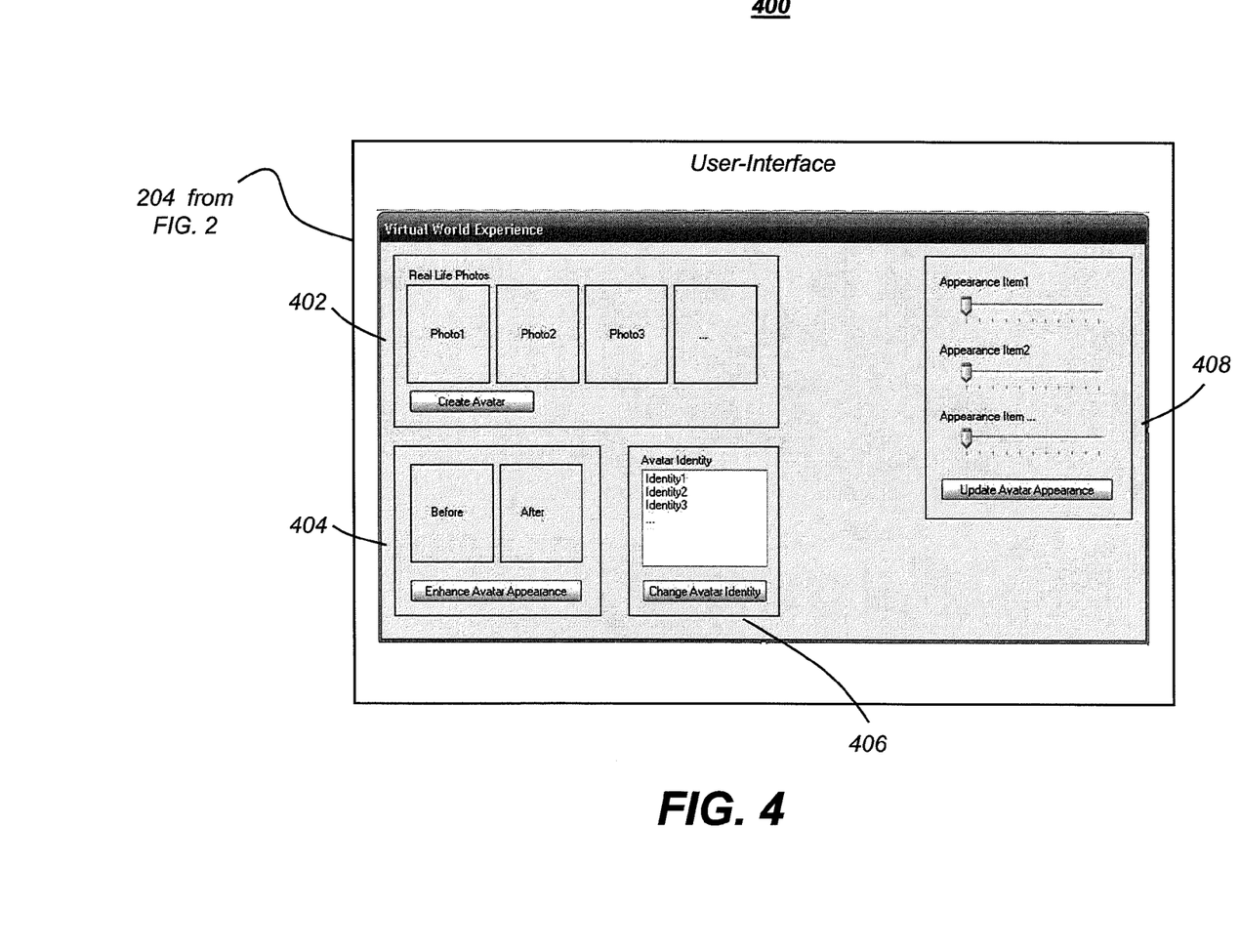
FIG. 4 is a screenshot of a sample user-interface where avatar-appearance-editing tools may be configured, according to an embodiment of the present invention.

The data processing system 110 includes one or more data processing devices that implement the processes of the various embodiments of the present invention, including the example process of FIG. 2 and user-interfaces of FIGS. 3 and 4 described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The processor-accessible memory system 140 includes one or more processor-accessible memories configured to store information, including the information needed to execute the processes of the various embodiments of the present invention, including the example process of FIG. 2 and user-interfaces of FIGS. 3 and 4 described herein. The processor-accessible memory system 140 may be a distributed processor-accessible memory system including multiple processor-accessible memories communicatively connected to the data processing system 110 via a plurality of computers and/or devices. On the other hand, the processor-accessible memory system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the processor-accessible memory system 140 is shown separately from the data processing system 110, one skilled in the art will appreciate that the processor-accessible memory system 140 may be stored completely or partially within the data processing system 110. Further in this regard, although the user-interface system 130 is shown separately from the data processing system 110, one skilled in the art will appreciate that one or both of such systems may be stored completely or partially within the data processing system 110.

The user-interface system 130 may include a mouse, a keyboard, another computer, or any device or combination of devices that from which or via which data is input to the data processing system 110. The user-interface system 130 also may include a display device, a processor-accessible memory, or any device or combination of devices to which or via which data is output by the data processing system 110. In this regard, if the user-interface system 130 includes a processor-accessible memory, such memory may be part of the processor-accessible memory system 140 even though the user-interface system 130 and the processor-accessible memory system 140 are shown separately in FIG. 1.

FIG. 2 illustrates a method for configuring a particular user's user-interface to a virtual world, according to an embodiment of the present invention. Step 202 involves identifying behavioral characteristics of the user, the behavioral characteristics indicating how the user controls the avatar in the virtual world. Such behavioral characteristics may include, but are not limited to a measure of a user's degree of permanence in a virtual world; or the manner in which a user constructs one or more identities in the virtual world.

A user's particular degree of permanence refers to whether or not a user exhibits behaviors that will cause the user to be a permanent user of a virtual world. A highly 'permanent' user may be defined as a user who is likely to return to the virtual world in order to fulfill one or more social obligations. Permanence does not include the frequency that a user visits a virtual world, the duration of each of the user's visits to the virtual world, or the duration since a user first joined the virtual world. According to an embodiment of the present invention, a user can be classified into one of two groups depending on whether or the user has a high or low degree of permanence in the virtual world. Users that exhibit a high degree of permanence in the virtual world are sometimes referred to herein as "Lifers" and users that exhibit a low degree of permanence in the virtual world are sometimes referred to herein as "Casuals".

According to an embodiment of the present invention, the high degree of permanence may be determined at least by a determination that a user's avatar (a) has a job in the virtual world, (b) owns property in the virtual world, (c) has a residence in the virtual world, (d) has a partner in the virtual world, or (e) combinations thereof. Having a job refers to whether or not a user performs a specific act in the virtual world according to a particular schedule, where the user gets compensated for the activity. Having property in the virtual world that the user owns refers to whether or not the user has purchased virtual world land, e.g., from a company operating the virtual world or from another user of the virtual world. Having a residence in the virtual world refers to whether or not the user has constructed a dwelling in the virtual world or pays rent for a virtual dwelling. Having a partner in the virtual world refers to whether or not the user has formed a relationship with another virtual world user that has the same characteristics of a marriage or common-law relationship in real life.

For example, Helena is a virtual world user that may be classified as a Lifer. Helena owns part of an island in the virtual world which she has purchased from the company who has constructed the virtual world environment. Helena has built a house on her property and decorated the house with virtual objects such as a couch and bed. Helena's avatar resides in the house. Helena also has a partner in the virtual world. She also partakes in a large amount of activities with the partner such as traveling, eating dinner together, and dancing at clubs. Helena also works in the virtual world. She is a hostess at a dance club where she welcomes visitors to the dance club. Helena matches multiple criteria that make her a Lifer: (a) she has a job in the virtual world, (b) she owns property in the virtual world, (c) she has a residence in the virtual world in which her avatar lives, and (d) she has a partner in the virtual world. Accordingly, the data processing system 110 may be configured to determine that Helena exhibits a high degree of permanence in the virtual world.

According to an embodiment of the present invention, there also exist users who do not exhibit a high degree of permanence in the virtual world. These are users who come to the virtual world on a casual basis to meet and interact with people and form relationships. The distinction may be that these users do not have: (a) a job in the virtual world, (b) property in the virtual world, (c) a residence in the virtual world, or (d) a partner in the virtual world. One of ordinary skill in the art will appreciate, however, that the line between users exhibiting a 'high' degree of permanence and users exhibiting a 'low' degree of permanence may be drawn differently.

As an example of a user exhibiting a low degree of permanence, according to an embodiment, consider Larry. Larry comes to the virtual world on a daily basis and spends several hours each day interacting in the virtual world. Larry has friends that he has met in the virtual world, some of which he shares a strong relationship. Larry will meet various friends at different locations in the virtual world (e.g., dance clubs, malls, coffee shops) where they will converse. There is no single place in which Larry can always be found in the virtual world. Despite coming to the virtual world often and for long durations of time, Larry does not meet any of the requirements for having a high degree of permanence in the virtual world: (a) he does not have a job in the virtual world, (b) he does not own property in the virtual world, (c) he does not have a residence in the virtual world, and (d) he does not have a partner in the virtual world. Because of behavioral characteristics, Larry is considered a Casual in the virtual world. That is, Larry is deemed by the data processing system 110 to exhibit a low degree of permanence, according to an embodiment of the invention.

The degree of permanence that a user of a virtual world exhibits can be detected at least by an activity logger or a user profile. An activity logger refers to computer software that can record the activities that a user performs in a virtual world. Such activities may include the places a user visits in the virtual world, the people that are present in the locations that the user is present, the actions that a user performs in a location, or combinations thereof. An inference engine and rule-based system, known in the art, can analyze behavioral characteristics identified by the activity logger to indicate a user's particular degree of permanence as described above, for example, and to configure the user's user-interface based at least on that degree of permanence, as described below with respect to FIG. 3, for example. A user profile refers to a user-interface component where a user can record personal attributes that other users can read. Users can record attributes such as a job location in the virtual world or virtual world occupational description, a property location in the virtual world, a residence location in the virtual world, the name of a partner in the virtual world, combinations thereof, etc. An inference engine and rule-based system can analyze behavioral characteristics identified in the user profile to indicate a user's degree of permanence as described above, for example, and to configure the user's user-interface based at least on that degree of permanence, as described below with respect to FIG. 3, for example.

According to an embodiment of the present invention, the manner in which a user constructs one or more identities in the virtual world refers to (a) a degree to which the user separates an identity of the avatar in the virtual world from an identity of the user in real life, (b) a number of identifies the user presents in the virtual world, (c) a continuity of the avatar's identity over time, (d) a degree to which the avatar's identity visually resembles the user's identity, (e) a degree to which the avatar appears to be photorealistic, of (f) combinations thereof. These factors may be evaluated based at least upon an analysis of the behavioral characteristics identified at step 202.

According to an embodiment, the degree to which a user separates an identity in the virtual world from the user's identity in real life refers to whether or not a user presents the same identity in the virtual world as the user does in real life. Some users choose to present an identity that matches their real life identity. Other users choose to present an identity in the virtual world that does not match their identity in real life.

According to an embodiment, the number of identities the user presents in the virtual world refers to how many different identities a user presents in the virtual world. A user can present a single identity through one virtual representation (e.g., an avatar), multiple identities through one virtual representation (e.g., an avatar), or multiple identities through more than one virtual representation (e.g., an avatar per identity).

The continuity of a virtual world identity over time may refer to whether or not a user's identity in the virtual world changes over time.

According to an embodiment, the degree to which the identity of the user in the virtual world looks like the user in real life refers to how similar a user's virtual representation looks like the user's image in real life. A user can present similar visual characteristics in the user's virtual representation as the user has in real life. For example, the hair style of the virtual representation can have the same look and color as the user's hair style in real life, or the height of the user's virtual representation could be the same as the user's height in real life.

The degree to which a user appears to be photorealistic may refer to the photorealism of the user's virtual representation.

According to an embodiment of the present invention, the above factors are utilized by the data processing system 110 to indicate that the user controls the avatar to have a particular identity category, the particular identity category indicating a relationship between an identity of the avatar and an identity of the user. For example, the data processing system may be configured to classify a user into one or more of four categories: Realistics, Ideals, Fantasies, and Roleplayers, based at least upon an analysis of the behavioral characteristics identified at step 202. Such analysis may use the factors described above.

According to an embodiment, Realistics may be defined as virtual world users who have the same identity in the virtual world as they do in real life. They see their virtual world behaviors and activities as an extension of their real life behaviors and activities. Because of this, Realistics present a personality in the virtual world that is the same as their personality in real life. They also aim to create a virtual representation (e.g., avatar) in the virtual world that looks like their real life self in terms of one or more physical characteristics. Realistics also desire to maintain continuity with their identity over time. For example, Mike is a virtual world user that may be classified as a Realistic. Mike owns a dance club, apartments, and a shopping mall in the virtual world and other virtual world users pay Mike money for leasing space in his virtual world properties. Mike also makes virtual items like motorcycles, which he also sells to other virtual world users. Mike uses his income in the virtual world from these activities to pay for his activities in real life. To Mike, his activities in the virtual world are an extension of his activities in real life. The friends Mike has made in the virtual world are also friends that Mike has in real life. Because of these behaviors, Mike aims to have the same identity in the virtual world as he does in real life. Mike also wants his virtual representation to look like he does in real life in terms of its physical characteristics (e.g., same face shape, eye color, hair style, hair color).

According to an embodiment, Ideals are virtual world users who have the same identity in the virtual world as they do in real life, though they do not want to present all aspects of their real life self in the virtual world. They are similar to Realistics but differ because they do not want their virtual representation in the virtual world to appear the same as their body appears in real life. Instead, they want to appear like they do in real life in an idealized fashion. That is, they want to enhance physical attributes of their real life self and present this enhanced version as their virtual representation. For example, they may want to have a better hair style, be taller, thinner, or look younger. Like Realistics, Ideals also aspire to maintain continuity with their identity over time. Some Ideals want to look photorealistic while other Ideals prefer to appear cartoon-like and non-photorealistic. This latter group desire non-photorealism so that they will be visually reminded that their activities in the virtual world are not a representation of reality.

For example, Taylor is a virtual world user that may be classified as an Ideal. Taylor has constructed her virtual representation to match physical characteristics of her real life self, but has altered these to create idealized characteristics. She has enlarged the size of her chest, reduced the size of her hips, and made her hair appear shorter in her virtual representation when compared to her real life appearance. Taylor prefers her virtual representation to look like computer animations as opposed to photorealistic humans because she finds this quality level reminds her that the virtual world does not represent real life.

According to an embodiment, Fantasies are virtual world users who want to have two separate identities, one in the virtual world and one in real life. Fantasies want to masquerade in the virtual world as someone different than they are in real life. This virtual identity will maintain continuity and not change over time. Fantasies purposely want to construct their virtual appearance to look different than their appearance in real life. The virtual appearance will match the identity the user wishes to present in the virtual world. Fantasies do not change this appearance over time beyond minor updates to one's clothing and wardrobe. Fantasies also aspire to having a virtual representation that is non-photorealistic because they want to be visually reminded that their activities in the virtual world represent a fantasy life. For example, Linda is a virtual world user that we can classify in the Fantasies group. Linda has created an identity in the virtual world that does not match her identity in real life. In real life, she is divorced and has two children. In the virtual world, she is married and has no children. Linda's virtual representation looks quite different than her real life appearance. This matches her desire to have two separate identities. Linda tries to mentally differentiate her two identities (virtual world and real life) and finds that it helps by having a virtual representation that looks cartoon-like and not photorealistic.

According to an embodiment, Roleplayers are virtual world users who participate in the virtual world to experience behaviors and activities that they are unable to experience in real life. They have multiple identities, one in real life and more than one in the virtual world. This is so that they can fulfill new fantasies and change their identity over time. Thus, Roleplayers do not maintain identity continuity. Roleplayers aim to create a virtual representation for the virtual world that does not look similar to their real life appearance. Instead, they want the virtual representation to match the fantasy that they are trying to fulfill in the virtual world. Roleplayers also desire to create a virtual representation that is photorealistic because they want their fantasies to be as realistic as possible. Roleplayers are different than Fantasies because Roleplayers have multiple virtual identities whereas Fantasies have one. Roleplayers also desire photorealistic virtual representations and Fantasies do not. For example, Kala is a virtual world user that we can classify as a Roleplayer. Kala changes her virtual appearance and identity on a daily to weekly basis in the virtual world. Some days she is a princess wearing beautiful gowns and jewels, other days she is a vampire wearing black boots with wild hair, etc. To achieve appearances that match these varying identities, Kala will change her clothing, hair style, and personality in the virtual world routinely.

The identity category of a user, e.g., Realistics, Ideals, Fantasies, and Roleplayers, can be indicated at least by a user profile. A user profile refers to a user-interface component that a user can record personal attributes in that other users can then read. Users can record attributes such as a whether or not they desire to separate their real life identity from their virtual world identity, whether or not they desire to look photorealistic, or the extent to which they resemble their real life self. An inference engine and rule-based system, known in the art, can analyze behavioral characteristics identified by the user profile to indicate a user's particular identity category, and to configure the user's user-interface based at least on that particular identity category, as described below with respect to FIG. 4, for example.

Step 204 of FIG. 2 involves configuring image-capture-or-sharing tools, avatar-appearance-editing tools, or both in the user-interface based at least upon an analysis of the behavioral characteristics of the user at step 202. The user-interface may be configured at least by (a) altering the manner in which user-interface tools are presented to the user; or, (b) altering the manner in which an avatar is visually represented in the virtual world.

FIG. 3 is a screenshot of a sample user-interface 300 where image-capture-or-sharing tools may be configured, according to an embodiment of the present invention. The user-interface 300 shows several user-interface tools that may be included or made more or less accessible based at least upon an analysis of the behavioral characteristics of the user performed by the data processing system 110. In this embodiment, the user-interface 300 includes a posed image capture tool 302, a spontaneous image capture tool 304, a collocated image sharing tool 306, and a distributed image sharing tool 308. The background of the user-interface can be any virtual world in which a user is participating.

The posed image capture tool 302 may provide users with at least a way to select avatars that will be included in a captured image, a pose-style that will automatically position avatars for the image, and a mechanism to capture an image. For example, in the sample user-interface 300, a user could select avatars in the user-interface 300 by clicking on each avatar with a mouse. The names of the selected avatars would appear in the listbox titled 'Avatars to Pose'. Users could click the button titled 'Pose Avatars' and the selected avatars would be arranged on the screen. Users could then click the button titled 'Capture Image' to record an image of the posed avatars in the virtual world.

The spontaneous image capture tool 304 may provide users with at least a means to capture the current virtual world scene as it appears or from ideal camera angles with ideal camera lighting. Ideal camera angles and camera lighting may be automatically computed based on content-understanding algorithms, known in the art. For example, in the sample user-interface 300, a user would click the button titled 'Capture Now' and the spontaneous image capture tool 304 would calculate an ideal camera angle and ideal camera lighting and capture the image of the virtual world scene using a screen capture facility.

The collocated image sharing tool 306 may provide users with at least a means to share photos with avatars in close proximity to them in the virtual world. "Close proximity" may be defined as avatars that are within approximately 30 feet of the avatar in the virtual world. All users whose avatars are in close proximity to each other may have the collocated image sharing tool 306 displayed on their respective user-interfaces, where each user is able to see the same image(s) at the same time. The user sharing the images may have at least a method for changing the photos that appear in the collocated image sharing tool 306. For example, in the sample user-interface 300, the listbox titled 'Photo Inventory' may contain a list of all of the images a user has captured. The user may select images to share by clicking on them in this list. All users whose avatars are in close proximity to each other see the same collocated image sharing tool 306 visible on their respective user-interfaces and the shared images in the boxes titled 'Photo1', 'Photo2', 'Photo3', ' . . . '. Users click the buttons titled 'Left' or 'Right' to cycle the photos that are shown in the boxes. As the buttons are clicked, photos will move in the direction of the label on the button that the user pressed. For example, if the button titled 'Left' is clicked, the image in box 'Photo3' will appear in box 'Photo2', the image in box 'Photo2' will appear in box 'Photo1', and the image in box 'Photo1' will no longer be visible.

The distributed image sharing tool 308 may provide users with at least a means to share photos with avatars that are not in close proximity to them in the virtual world. Users are able to select which avatars they wish to share images with and select which images they wish to share. Images shared with another avatar appear on the other avatar's user's screen. For example, in the sample user-interface 300, users see a contact list titled 'Friends' in the distributed image sharing tool 308. This contains a list of the user's friends, which are other virtual world avatars that a user has designated as friends. Users select avatars from this list by clicking on each avatar's name. The user-interface also contains a listbox titled 'Photo Inventory,' which contains a list of all of the images a user has captured. The user may select images to share by clicking on them in this list. Next, the user may click on the button titled 'Send Photos,' and the shared images will appear on the recipient avatar's user's screen.

The user-interface 300 may be configured based at least upon an analysis of the behavioral characteristics of a user in the virtual world. In this example, the user-interface 300 may be configured based at least upon the degree of permanence that a user exhibits in the virtual world. If a user has been classified as having a high degree of permanence in the virtual world, i.e., is a 'Lifer,' then the user-interface 300 may be configured to include or more efficiently include user-interface tools that match the needs of this group, such as making visible or more readily accessible a posed image capture tool 302, a spontaneous image capture tool 304, a collocated image sharing tool 306, a distributed image sharing tool 308, or combinations thereof. If a user has been classified as having a low degree of permanence in the virtual world, i.e., is a 'Casual,' then the user-interface 300 may be configured to include or more efficiently include user-interface tools that match the needs of this group, such as making visible or more readily accessible a spontaneous image capture tool 304 a distributed image sharing tool 308, or both. For Casuals, other interface tools, such as a posed image capture tool 302, a collocated image sharing tool 306, or both may be made inaccessible (e.g., not included in the user-interface 300 at all) or less readily accessible (e.g., requiring more menu navigation steps) in the user-interface 300.

FIG. 4 is a screenshot of a sample user-interface 400 where avatar-appearance-editing tools may be configured, according to an embodiment of the present invention. The user-interface 400 shows several user-interface tools that may be included or more efficiently included based at least upon an analysis of the behavioral characteristics of a user. In this embodiment, the user-interface 400 includes a real-life-appearance tool 402, an appearance enhancing tool 404, an identity management tool 406, and an appearance refinement tool 408. The background of the user-interface can be any virtual world in which a user is participating.

The real-life-appearance tool 402 may provide users with at least a selection of images or other multimedia containing images or video of a real life person that can be used to automatically construct an avatar that appears the same as the person in the multimedia in terms of physical characteristics. This avatar generation can be performed using one of the techniques already available in the art that use images or videos of a human to create a 3D representation. The real-life-appearance tool 402 could be used to generate an avatar that looks like the user or like any other human. For example, in the sample user-interface 400, the user is able to select multiple images of a real life person. Such selection may be performed by clicking on a box with the label 'Photo' at which point a file dialog box appears where the user can select an image file. The user can select multiple images in this same manner. Once images have been selected, the user clicks on 'Create Avatar' and an algorithm, known in the art, is used to generate an avatar based on the physical characteristics presented in the images.

The appearance enhancing tool 404 may provide users with at least a tool to enhance an avatar's appearance by applying image enhancement algorithms, such as those already available in the art. 'Enhanced,' in this regard, may be defined as being more physically attractive. For example, in the sample user-interface 400, the user is able to produce an avatar appearance that does not have any facial blemishes, is taller than the original avatar, and weighs less than the original avatar. The box labeled 'Before' shows the avatar's image before the transformation. The user clicks on the button labeled 'Enhance Avatar Appearance' and the avatar is enhanced and the box labeled 'After' shows the avatar's image after the transformation.

The identity management tool 406 may provide users with at least a way to store the visual appearance characteristics for multiple virtual world identities and change one's current appearance to match a different identity. For example, in the sample user-interface 400, the user sees a list of the identities that the user has created in the virtual world for the user's avatar. The user selects one of the identities in the listbox with the title 'Avatar Identity'. The user then clicks on the button 'Change Avatar Identity' and the appearance of the user's avatar changes to reflect the appearance of the new identity. Any changes made to the avatar's appearance are recorded with the identity that is currently selected in the listbox.

The appearance refinement tool 408 may provide users with at least a way to update attributes of their visual appearance. For example, in the sample user-interface 400, the user sees a list of appearance items labeled 'Appearance Item1,' 'Appearance Item2,' etc. Each has an associated slider that the user can adjust to alter the appearance item associated with the slider. If, for example, the first slider adjusted the length of a person's nose, then sliding the slider left could decrease the size of the nose and sliding the slider right could increase the size of the nose.

The user-interface 400 may be customized based at least on an analysis of the behavioral characteristics that a user has in the virtual world. In this example, the experience may be customized based at least on the manner in which a user constructs one or more identities in the virtual world.

If a user has been classified as a Realistic in the virtual world, then the user-interface may be configured to include or more efficiently include user-interface tools that match the needs of this group. For example, at least a real-life-appearance tool 402 may be made accessible or more readily accessible to the user via the user-interface 400, if the user is deemed to exhibit the Realistic identity category.

If a user has been classified as an Ideal, then the user-interface 400 may be configured to include or more efficiently include user-interface tools that match the needs of this group. For example, at least a real-life-appearance tool 402, an appearance-enhancing tool 404, or both, may be made accessible or more readily accessible to the user via the user-interface 400, if the user is deemed to exhibit the Ideal identity category.

Similarly, if a user has been classified as a Fantasy, then the user-interface 400 may be configured to include or more efficiently include at least an appearance-refinement tool 408. If a user has been classified as a Roleplayer, then the user-interface 400 may be configured to include or more efficiently include at least a real-life-appearance tool 402, an identity management tool 406, or an appearance-refinement tool 408. Interface tools that are not included or more efficiently included in the user-interface 400 may still be made accessible via the user-interface 400, but less efficiently, as by requiring further menu navigation steps to reach such tools.

Step 204 of FIG. 2 could also involve altering the manner in which a user is visually represented in the virtual world through a visual representation, such as an avatar, in which the alteration depends on the behavioral characteristics of the user. For example, if a user has been classified as a Realistic or a Roleplayer in the virtual world, then the user's avatar could be automatically rendered in a photorealistic manner using techniques such as those found in the art. If a user has been classified as an Ideal or a Fantasy in the virtual world, then the user's avatar could be automatically rendered in a non-photorealistic manner using techniques such as those found in the art.

Step 206 involves storing information pertaining to results of the configuring step in a processor-accessible memory system. For example, information indicating the manner in which a particular user-interface is to be configured may be stored in the processor-accessible memory system 140.

It is to be understood that the exemplary embodiments are merely illustrative of the present invention and that many variations of the above-described embodiments can be devised by one skilled in the art without departing from the scope of the invention. It is therefore intended that all such variations be included within the scope of the following claims and their equivalents.

PARTS LIST

100 System
110 Data Processing System
130 User-interface System
140 Data Storage System
200 Method
202 Identify Behavioral Characteristics
204 Configure Tools in User-interface
206 Memory Storage Step
300 Exploded View of Step 204
302 Posed Image Capture Tool
304 Spontaneous Image Capture Tool
306 Collocated Image Sharing Tool
308 Distributed Image Sharing Tool
400 Exploded View of Step 204
402 Real-life Appearance Tool
404 Appearance-Enhancing Tool
406 Identity Management Tool
408 Appearance Refinement Tool

The invention claimed is:

1. A method comprising:
analyzing, by a hardware processor, a behavior of a user in a virtual world based at least on control of an avatar in the virtual world to determine a behavioral category for the user, wherein the analyzing includes determining a degree of similarity between the user in a real life and the avatar in the virtual world, wherein analyzing the behavior of the user further comprises:
determining a number of identities the user presents in the virtual world;
determining a degree to which the avatar's identity visually resembles the user's identity; and
determining a degree to which the avatar appears to be photorealistic;
customizing, by the hardware processor, a user-interface of the virtual world based at least on the determined behavioral category, wherein the user-interface is customized by configuring image-capture-or-sharing tools, avatar-appearance-editing tools, or both in the user-interface; and
storing, by the hardware processor, information based at least on the customized user-interface.

2. The method of claim 1, wherein the analyzed behavior indicates that the user exhibits a high degree of permanence in the virtual world, and wherein the user-interface is customized to include a posed image-capture tool, a collocated image-sharing tool, or both, based at least on the high degree of permanence.

3. The method of claim 2, wherein the image-capture-or-sharing tools are further customized to include a spontaneous image-capture tool, a distributed image-sharing tool, or both.

4. The method of claim 1, wherein the analyzed behavior indicates that the user exhibits a low degree of permanence in the virtual world, and wherein the image-capture-or-sharing tools are customized to exclude a posed image-capture tool, a collocated image-sharing tool, or both, based at least on the low degree of permanence.

5. The method of claim 4, wherein the image-capture-or-sharing tools are further customized to include a spontaneous image-capture tool, a distributed image-sharing tool, or both.

6. The method of claim 1, wherein analyzing the behavior of the user further comprises analyzing data from an activity logger or a user profile associated with the user.

7. The method of claim 1, wherein the analyzed behavior indicates that the user controls the avatar to have a particular identity category, the particular identity category indicating a relationship between an identity of the avatar and an identity of the user, and wherein the avatar-appearance-editing tools are customized based at least on the particular identity category.

8. The method of claim 7, wherein the analyzed behavior indicates that the particular identity category is a realistic-identity category indicating that the avatar's identity and the user's identity are consonant or substantially consonant, and wherein the avatar-appearance-editing tools are customized to include a real-life-appearance-generation tool, a photorealistic rendering tool, or both, based at least on the indication of the realistic-identity category.

9. The method of claim 7, wherein the analyzed behavior indicates that the particular identity category is an ideal-identity category indicating that the avatar's identity is an ideal or a substantially ideal representation of the user's identity, and wherein the avatar-appearance-editing tools are customized to include a real-life-appearance-generation tool, an appearance-enhancing tool, or both, based at least on the indication of the ideal-identity category.

10. The method of claim 7, wherein the analyzed behavior indicates that the particular identify category is a fantasy-identity category indicating that the avatar's identity is different or substantially different than the user's identity, and wherein the avatar-appearance-editing tools are customized to include an appearance-refinement tool, based at least on the indication of the fantasy-identity category.

11. The method of claim 7, wherein the user has multiple identities in the virtual world, wherein the analyzed behavior indicates that the user controls one or more avatars to have a particular identity category, the particular identity category indicating a relationship between the identities of the one or more avatars and the user's identity, wherein the analyzed behavior indicates that the particular identity category is a roleplayer-identity category indicating that the identities of the one or more avatars are different than the user's identity, and wherein the avatar-appearance-editing tools are customized to include an appearance-refinement tool, a photo-realistic rendering tool, an identity management tool, or combinations thereof, based at least on the indication of the roleplayer-identity category.

12. The method of claim 1, wherein analyzing the behavior of the user further comprises identifying characteristics of the avatar.

13. The method of claim 12, wherein the identified characteristics include a job in the virtual world.

14. The method of claim 12, wherein the identified characteristics include a photorealistic quality of the avatar.

15. A system comprising:
a memory; and
a hardware processor coupled to the memory, wherein the hardware processor is configured to:
- analyze a behavior of a user in a virtual world based at least on how the user controls an avatar in the virtual world to determine a behavioral category for the user, wherein the analyzing includes determining a degree of similarity between the user in a real life and the avatar in the virtual world, wherein analyzing the behavior of the user further comprises:
  - determining a number of identities the user presents in the virtual world;
  - determining a degree to which the avatar's identity visually resembles the user's identity; and
  - determining a degree to which the avatar appears to be photorealistic;
- customize a user-interface of the virtual world based at least on the determined behavioral category, wherein the user-interface is customized by configuring image-capture-or-sharing tools, avatar-appearance-editing tools, or both in the user-interface; and
- store information based at least on the customized user-interface.

16. The system of claim 15, wherein the analyzed behavior indicates that the user exhibits a high degree of permanence in the virtual world, and wherein the user-interface is customized to include a posed image-capture tool, a collocated image-sharing tool, or both, based at least on the high degree of permanence.

17. The system of claim 15, wherein the analyzed behavior indicates that the user exhibits a low degree of permanence in the virtual world, and wherein the image-capture-or-sharing tools are customized to exclude a posed image-capture tool, a collocated image-sharing tool, or both, based at least on the low degree of permanence.

18. A non-transitory computer-readable medium having instructions stored thereon that, upon execution by a computing device, cause the computing device to perform operations comprising:
- analyzing a behavior of a user in a virtual world based at least on how the user controls an avatar in the virtual world to determine a behavioral category for the user, wherein the analyzing includes determining a degree of similarity between the user in a real life and the avatar in the virtual world, wherein analyzing the behavior of the user further comprises:
  - determining a number of identities the user presents in the virtual world;
  - determining a degree to which the avatar's identity visually resembles the user's identity; and
  - determining a degree to which the avatar appears to be photorealistic;
- customizing a user-interface of the virtual world based at least on the determined behavioral characteristics, wherein the user-interface is customized by configuring image-capture-or-sharing tools, avatar-appearance-editing tools, or both in the user-interface; and
- storing information based at least on the customized user-interface.

* * * * *